US010853947B2

(12) United States Patent
Honda (10) Patent No.: US 10,853,947 B2
(45) Date of Patent: Dec. 1, 2020

(54) DEVICE, METHOD, AND PROGRAM FOR DETECTING BOUNDARY LINES INCLUDED IN CAPTURED IMAGES

(71) Applicant: Mobility Technologies Co., Ltd., Tokyo (JP)

(72) Inventor: Hiroto Honda, Tokyo (JP)

(73) Assignee: Mobility Technologies Co., Ltd., Tokyo (JP)

( * ) Notice: Subject to any disclaimer, the term of this patent is extended or adjusted under 35 U.S.C. 154(b) by 0 days.

(21) Appl. No.: 16/184,785

(22) Filed: Nov. 8, 2018

(65) Prior Publication Data

US 2019/0139226 A1 May 9, 2019

(30) Foreign Application Priority Data

Nov. 9, 2017 (JP) .................. 2017-216824

(51) Int. Cl.
*G06T 7/13* (2017.01)
*G06T 7/70* (2017.01)
*G06K 9/46* (2006.01)
*G06K 9/62* (2006.01)
*G06K 9/00* (2006.01)
*G06T 7/12* (2017.01)

(52) U.S. Cl.
CPC ............ *G06T 7/13* (2017.01); *G06K 9/00798* (2013.01); *G06K 9/4604* (2013.01); *G06K 9/4628* (2013.01); *G06K 9/6274* (2013.01); *G06T 7/12* (2017.01); *G06T 7/70* (2017.01); *G06K 9/6267* (2013.01); *G06T 2207/20081* (2013.01); *G06T 2207/20084* (2013.01); *G06T 2207/30256* (2013.01)

(58) Field of Classification Search
CPC .... G06T 7/13; G06T 7/12; G06T 7/70; G06T 2207/20084; G06T 2207/30256; G06T 2207/20081; G06K 9/4628; G06K 9/00798; G06K 9/6274; G06K 9/4604; G06K 9/6267
See application file for complete search history.

(56) References Cited

U.S. PATENT DOCUMENTS 10,528,824 B2 * 1/2020 Zou .................. G06K 9/6289
2013/0265424 A1 * 10/2013 Zhang ............... G06K 9/00798
348/148

(Continued)

FOREIGN PATENT DOCUMENTS

JP 2017-146645 A 8/2017

*Primary Examiner* — Wesley J Tucker
(74) *Attorney, Agent, or Firm* — Procopio, Cory, Hargreaves & Savitch LLP (57) ABSTRACT

A CPU 11 of a boundary line detection device 10 according to an embodiment of the present invention is configured to function as an image acquisition component 112 that acquires images captured (inputted) via an image input device (a camera or the like), captured images received via a network, and so forth, and a boundary line detector 114 that detects a boundary line included in these captured images. The boundary line detector 114 is configured to specify, using a learned model 152, a plurality of estimated points estimated to be points on a boundary line included in a captured image and to detect the boundary line included in the captured image on the basis of at least the specified estimated points.

11 Claims, 8 Drawing Sheets

(56) References Cited

U.S. PATENT DOCUMENTS

| | | | |
|---|---|---|---|
| 2014/0003709 A1* | 1/2014 | Ranganathan | G06K 9/00798 |
| | | | 382/159 |
| 2017/0267177 A1* | 9/2017 | Nariyambut Murali | ..................... |
| | | | G06K 9/4628 |
| 2017/0300763 A1* | 10/2017 | Zou | G06K 9/6271 |
| 2018/0232585 A1* | 8/2018 | Kim | G06N 3/0445 |
| 2019/0147253 A1* | 5/2019 | Bai | G06K 9/6232 |
| | | | 382/103 |
| 2019/0286153 A1* | 9/2019 | Rankawat | G06T 7/11 |
| 2020/0074189 A1* | 3/2020 | Xie | G06T 7/13 |

\* cited by examiner

DEVICE, METHOD, AND PROGRAM FOR DETECTING BOUNDARY LINES INCLUDED IN CAPTURED IMAGES

This application claims foreign priority under 35 USC 119 based on Japanese Patent Application No. 2017-216824, filed on Nov. 9, 2017, the contents of which is incorporated herein in its entirety by reference.

BACKGROUND

1. Field

The present invention relates to a device, a method, and a program (e.g., non-transitory computer-readable medium including instructions to be performed on a processor) for detecting a boundary line included in a captured image.

2. Related Art

Techniques for detecting a boundary line included in a captured image have been proposed in the past. For example, the following Patent Document 1 discloses a device that recognizes a white line on a road on the basis of an image captured outside of a vehicle. More specifically, this device is configured such that a white line on a road is recognized by repeating processing in which white line pixels are determined on the basis of changes in the brightness of a plurality of pixels constituting a row in an image.

PRIOR ART DOCUMENT

Patent Documents

[Patent Document 1]: Japanese Patent Application 2017-146645

SUMMARY

Problems to be Solved by the Invention

However, a rule-based approach such as determining white line pixels based on changes in brightness as mentioned above tends to be influenced by the external environment (such as the characteristics and performance of the camera that captures the images, the environment in which the images are captured (the weather, etc.), and so forth). Therefore, there is a need for some way to reduce the influence of the external environment.

One embodiment of the present invention has as its object the reduction of the influence of the external environment in detecting a boundary line included in an image. Other objects of embodiments of the present invention will become apparent through reference to the entire Specification.

Means for Solving the Problems

The device according to one embodiment of the present invention is a device for detecting a boundary line included in a captured image, comprising one or more computer processors, wherein, in response to the execution of a readable instruction, said one or more computer processors execute a step of acquiring a captured image and a step of detecting a boundary line included in the acquired captured image; and the detection step includes specifying, using a learned model (e.g., predetermined), a plurality of estimated points estimated to be points on a boundary line included in the acquired captured image and detecting the boundary line included in the acquired captured image on the basis of at least the specified plurality of estimated points.

The method according to one embodiment of the present invention is a method for detecting a boundary line included in a captured image, executed by one or more computers, wherein said method comprises a step of acquiring a captured image and a step of detecting a boundary line included in the acquired captured image; and the detection step includes specifying, using a predetermined learned model, a plurality of estimated points estimated to be points on a boundary line included in the acquired captured image and detecting the boundary line included in the acquired captured image on the basis of at least the specified plurality of estimated points.

The program (e.g., non-transitory computer-readable medium including instructions to be performed on a processor) according to one embodiment of the present invention is a program for detecting a boundary line included in a captured image, wherein said program is executed on one or more computers to cause the one or more computers to execute processing to acquire a captured image and processing to detect a boundary line included in the acquired captured image; and the detection processing includes specifying, using a predetermined learned model, a plurality of estimated points estimated to be points on a boundary line included in the acquired captured image and detecting the boundary line included in the acquired captured image on the basis of at least the specified plurality of estimated points.

Effects of the Invention

Various embodiments of the present invention reduce the influence of the external environment in detecting a boundary line included in an image.

DETAILED DESCRIPTION OF THE INVENTION

Embodiments of the present invention will now be described through reference to the drawings.

Figure 1:
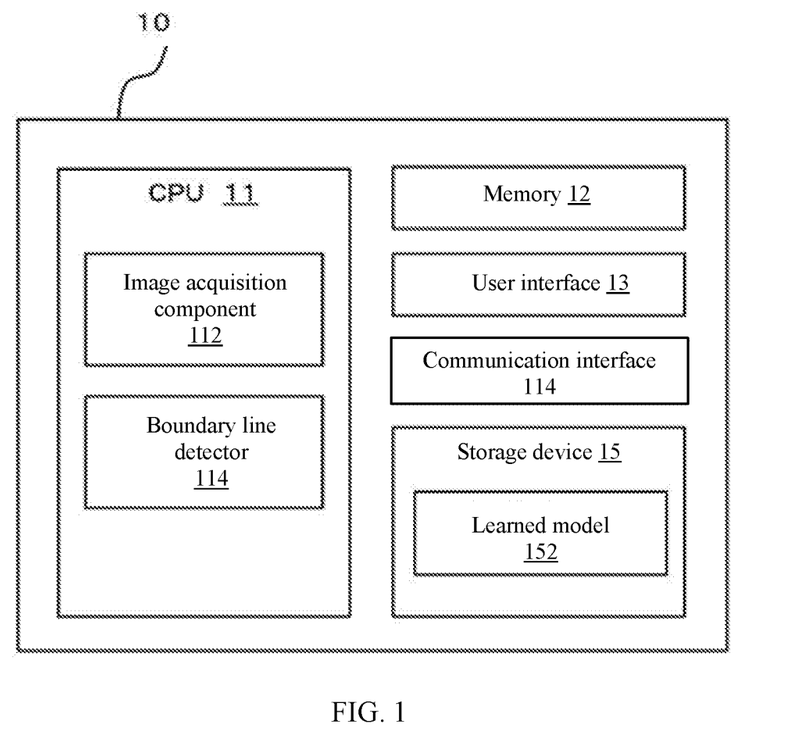
FIG. 1 is a simplified configuration diagram of the configuration of a boundary line detection device according to an embodiment of the present invention.

FIG. 1 is a simplified configuration diagram of the configuration of a boundary line detection device 10 according to an embodiment of the present invention. The device 10 is configured as an ordinary computer and, as shown in FIG. 1, comprises a CPU (computer processor) 11, a main memory 12, a user interface 13, a communication interface 14, and a storage device 15, and these constituent elements are electrically connected via a bus or the like (not shown).

The CPU 11 reads various programs (e.g., non-transitory computer-readable medium including instructions to be performed on a processor) stored in the storage device 15 or the like into the main memory 12, and executes the various commands included in these programs. The main memory 12 is constituted by a DRAM or the like, for example.

The user interface 13 is any of various input/output devices for exchanging information with the user. The user interface 13 includes, for example, an information input device such as a keyboard, a pointing device (such as a mouse or a touch panel), a voice input device such as a microphone, and an image input device such as a camera. The user interface 13 also includes an image output device (display device) such as a display, and an audio output device such as a speaker.

The communication interface 14 is constituted as hardware such as a network adapter, various kinds of communication software, or a combination of these, and is configured to perform wired or wireless communication.

The storage device 15 is constituted by a magnetic disk or a flash memory, for example. The storage device 15 stores various programs (e.g., non-transitory computer-readable medium including instructions to be performed on a processor) including operating systems, various data, and the like. In this embodiment, the storage device 15 stores the learned model 152, which is used in the detection of boundary lines included in images.

In this embodiment, the device 10 can be configured using a plurality of computers each having the above-mentioned hardware configuration. In addition, the device 10 can be configured to comprise a GPU (computer processor), which is a processor specialized for image processing.

The functions of the boundary line detection device 10 of this embodiment will now be described. As shown in FIG. 1, the CPU 11 of the device 10 is configured to function as an image acquisition component 112 that acquires images captured (inputted) via an image input device (a camera or the like) or captured images received via a network, and a boundary line detector 114 that detects a boundary line included in these captured images. These functions are performed by the cooperative operation of the hardware such as the CPU 11 and the main memory 12, etc., and the various programs (e.g., non-transitory computer-readable medium including instructions to be performed on a processor) and data stored in the storage device 15, etc., and the CPU 11 executes commands included in the programs that have been read into the main memory 12, for example.

The boundary line detector 114 executes various processing related to the detection of a boundary line included in a captured image. In this embodiment, the boundary line detector 114 is configured to specify, using the learned model 152, a plurality of estimated points estimated to be points on a boundary line included in a captured image and to detect the boundary line included in the captured image on the basis of at least the specified plurality of estimated points. The learned model 152 is configured as a convolutional neural network (CNN), for example.

Thus, the boundary line detection device 10 in this embodiment is configured to detect, using the learned model 152, a boundary line included in a captured image on the basis of the specified plurality of estimated points, and the detection of the boundary line is accomplished by employing a machine learning approach. As a result, the influence of the external environment is reduced as compared to when a rule-based approach is employed.

The boundary lines in this embodiment may include straight lines and curved lines. For example, the boundary line detector 114 can be configured to detect a straight boundary line on the basis of two or more estimated points, or to detect a curved boundary line on the basis of three or more estimated points.

Also, the boundary lines in this embodiment include, but are not limited to, the boundary lines (including lane markers) of a lane of a road in an image showing what is ahead of or behind a traveling vehicle.

Also, the boundary line detector 114 can be configured to classify, using the learned model 152, a specified plurality of estimated points into one or more groups and to detect the boundary lines corresponding to each of one or more groups on the basis of at least the estimated points classified for each of the one or more groups. In other words, the boundary line detector 114 can be configured to group a plurality of estimated points so as to correspond to each of a plurality of boundary lines included in a captured image. Such a configuration makes it possible to individually detect a plurality of boundary lines included in a captured image.

In this embodiment, the grouping of a plurality of estimated points can be accomplished by applying various rules. For instance, the boundary line detector 114 is configured to classify into the same group a plurality of estimated points whose distances from a specific virtual line passing through the vanishing point in an acquired captured image fall within a range (e.g., predetermined). For example, it can be configured so that one estimated point included in a plurality of estimated points is classified into the same group as other estimated points whose distances from a virtual straight line connecting the one estimated point and the vanishing point fall within a predetermined range.

Here, the vanishing point is the point at which a plurality of parallel straight lines converge in perspective. For example, a position (e.g., predetermined) is set ahead of time for the vanishing point in a captured image, or it is dynamically set on the basis of the result of analyzing the captured image.

In this embodiment, the learned model 152 can be configured to estimate and output information specifying the position in the width direction (horizontal direction, lateral direction) at each of a plurality of specific positions in the height direction (vertical direction, longitudinal direction) of a boundary line included in the image. That is, the learned model 152 is generated by machine learning that uses, as learning data, a plurality of learning images each of which is associated with information including first position specifying information that specifies a position in the width direction at a first height of a boundary line included in the image (in other words, the position in the width direction of the intersection point between this boundary line and a virtual horizontal line of the first height) and second position specifying information that specifies a position in the width direction at a second height of this boundary line (in other words, the position in the width direction of the intersection between this boundary line and a virtual horizontal line of the second height), and is configured so that first and second position specifying information corresponding to an inputted image are estimated and outputted. In this case, the boundary line detector 114 is configured to specify a plurality of estimated points (the intersections between the boundary line and a virtual horizontal line) on the basis of the first and second position specifying information outputted from the learned model 152. Such a configuration is effective, for example, for detecting a boundary line extending in the up and down direction (height direction) in a captured image, or a boundary line extending in the front and back direction (by perspective).

In this embodiment, the boundary line may be detected so as to distinguish types of boundary lines (the line types may differ from one another in their appearance, such as their color and/or shape, for example). That is, the boundary line detector 114 can be configured to distinguishably specify a first type of estimated point estimated to be located on a first type of boundary line (such as a solid line) and a second type of estimated point estimated to be located on a second type of boundary line (such as a broken line), and to distinguishably detect the first type of boundary line and the second type of boundary line on the basis of the specified plurality of first and second types of estimated points. In this case, for example, the learned model 152 is generated by machine learning that uses, as learning data, a plurality of learning images each of which is associated with information including third position specifying information that specifies the position of points on a first type of boundary line included in the image and fourth position specifying information that specifies the position of points on a second type of boundary line included in the image, and is configured so that third and fourth position specifying information corresponding to an inputted image are estimated and outputted. The boundary line detector 114 can be configured such that a first type of estimated point is specified on the basis of the third position specifying information outputted from the learned model 152, while a second type of estimated point is specified on the basis of the fourth position specifying information outputted from the learned model 152. Such a configuration allows the type of boundary line being detected to be recognized.

A specific example of the boundary line detection device 10 of this embodiment having these functions will now be described. The device 10 in this specific example is configured to detect as a boundary line a lane marker (white line) on a road, which is included in an image showing what is ahead of a traveling vehicle.

Figure 2:
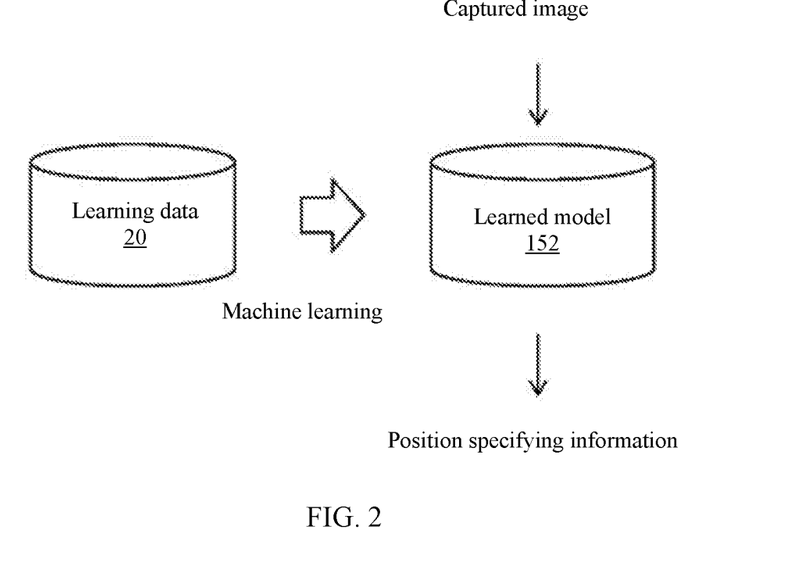
FIG. 2 is a diagram illustrating a learned model 152 in a specific example.

FIG. 2 is a diagram illustrating a learned model 152 in this example. As shown in the drawing, the learned model 152 of this example is generated by machine learning that uses the learning data 20, and is configured such that when a captured image is inputted, position specifying information for specifying the position of a plurality of estimated points, which are estimated as points on a lane marker included in the captured image, is outputted.

The learning data 20 includes a large number of learning images captured from a traveling vehicle. A learning image is, for example, still pictures constituting a moving picture captured via a camera (such as the camera of a drive recorder) provided so as to capture an image of what is ahead of the vehicle. The learning images are associated with position specifying information that specifies the positions of points on a lane marker included in the image.

Figure 3:
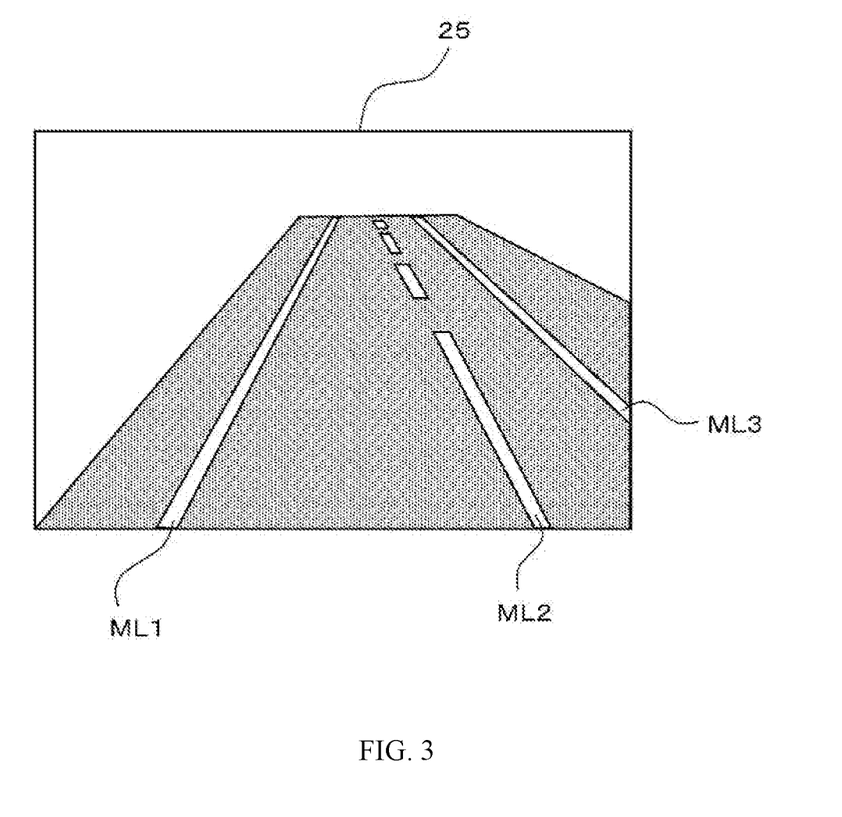
FIG. 3 is a diagram illustrating a learning image 25 in a specific example.

FIG. 3 shows a learning image 25 in this example. As discussed above, the learning image 25 is an image showing what is ahead of a traveling vehicle, and in the example in FIG. 3, three marker lines ML1 to ML3 are included. In FIG. 3, the marker line ML1 located on the far left side is a roadway edge marking having the appearance of a solid line. The marker line ML2 located to the right of the marker line ML1 is a lane boundary line having the appearance of a broken line. The marker line ML3 located on the far right side is a roadway center line having the appearance of a solid line. As can be seen from the fact that the center in the width direction of the entire learning image 25 is located between the marker lines ML1 and ML2, the vehicle that captured the image 25 is traveling in a lane between the marker lines ML1 and ML2 (the lane defined by the marker lines ML1 and ML2).

Figure 4:
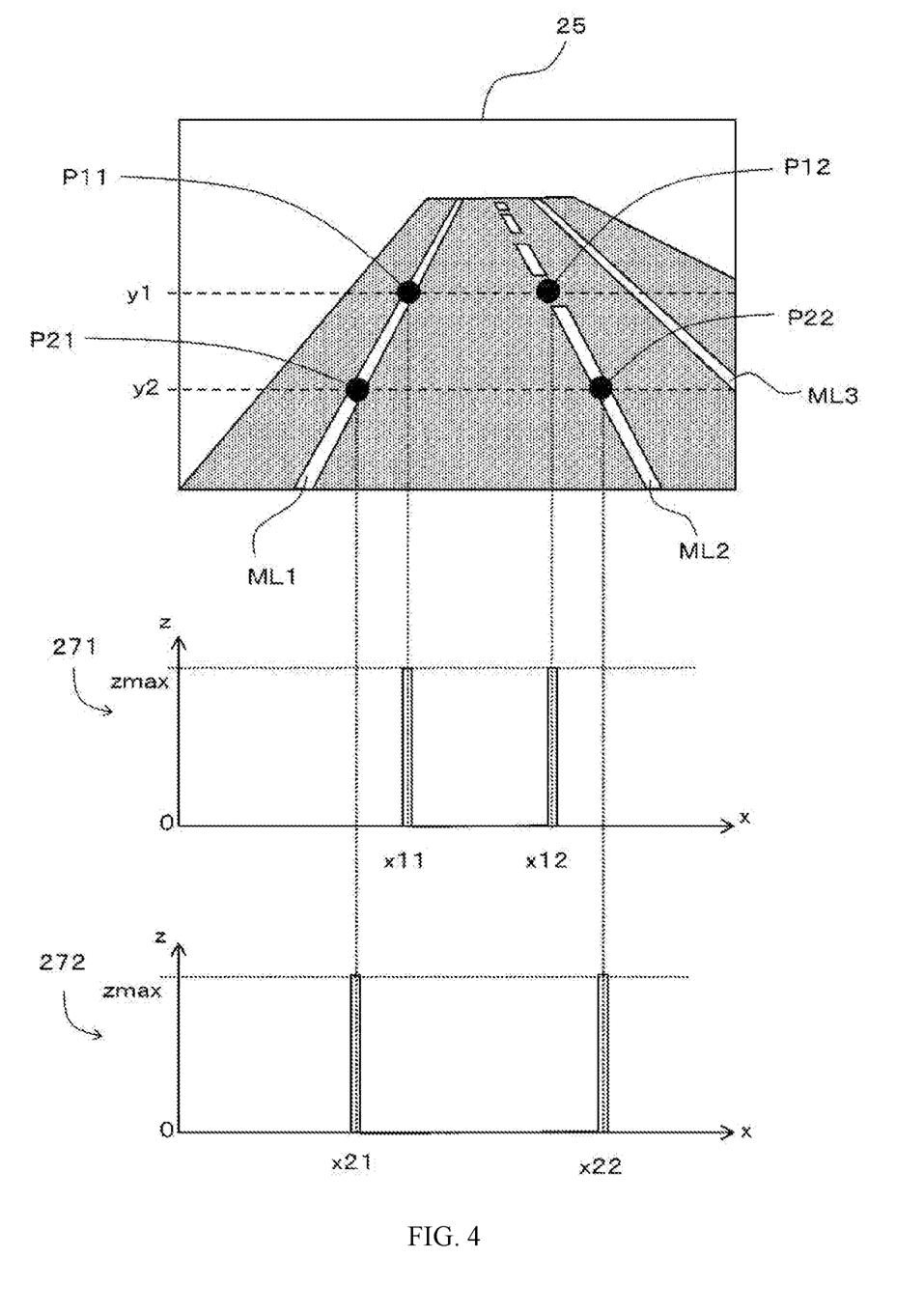
FIG. 4 is a diagram illustrating position specifying information 271 and 272 associated with the learning image 25.

FIG. 4 is a diagram illustrating the position specifying information 271 and 272 associated with the learning image 25 shown in FIG. 3. In this example, the position specifying information associated with the learning image specifies the positions of points on the marker lines that define the lane in which the vehicle is traveling (the marker lines on both sides of the lane, hereinafter sometimes referred to as "target marker lines"). For example, in the learning image 25, the target marker lines are the marker lines ML1 and ML2 on both sides of the lane in which the vehicle is traveling, and the far right marker line ML3 is not a target.

In this example, the information associated with the learning image includes first position specifying information that specifies the positions in the width direction at the height y1 of the target marker lines. For example, the first position specifying information 271 in FIG. 4 is information that specifies the positions in the width direction at the height y1 of the target marker lines ML1 and ML2, or in other words, information that specifies the positions in the width direction of the intersections P11 and P12 between the target marker lines ML1 and ML2 and a horizontal line with the height y1.

The information associated with the learning image also includes second position specifying information that specifies the positions in the width direction at the height y2 of the target marker lines. For example, the second position specifying information 272 in FIG. 4 is information that specifies the positions in the width direction at the height y2 of the target marker lines ML1 and ML2, or in other words, information that specifies the positions in the width direction of the intersections P21 and P22 between the target marker lines ML1 and ML2 and a horizontal line with the height y2.

In this example, the heights y1 and y2 are fixed (e.g., predetermined) values. For example, the height y1 is set to a value of ½ the height of the entire image 25, and the height y2 is set to a value of ½ the height y1.

In this example, the position specifying information is configured as information having a one-dimensional array format, and the position specifying information associated with the learning image has a maximum value (such as a value of 1) set at the specified position in the width direction, and has a minimum value (such as a value of 0) set at other positions. For example, as illustrated in FIG. 4, with the first position specifying information 271, the maximum value (zmax) is set at the positions x11 and x12 in the width direction of the above-mentioned intersection points P11 and P12, and with the second position specifying information 272, the maximum value (zmax) is set at the positions x21 and x22 in the width direction of the above-mentioned intersection points P21 and P22.

As described above, a large number of learning images each associated with the first and second position specifying information are prepared, and the learned model 152 is generated by machine learning that uses this large number of learning images as learning data.

Figure 5:
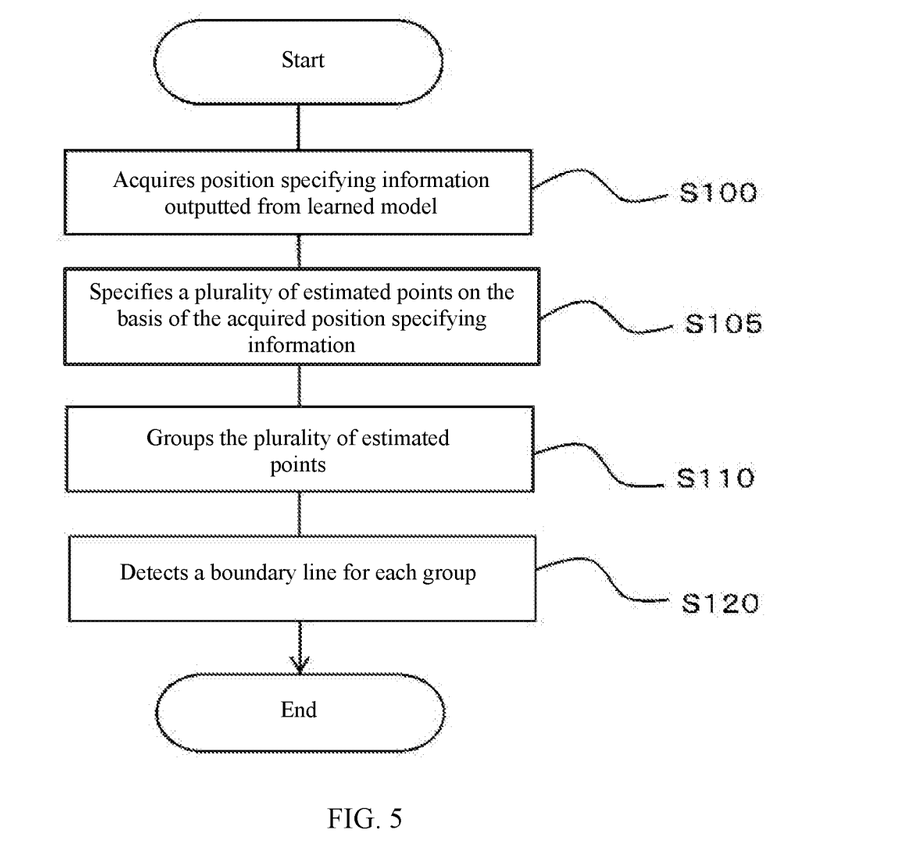
FIG. 5 is a flowchart illustrating the processing executed by the boundary line detection device 10.
Figure 6:
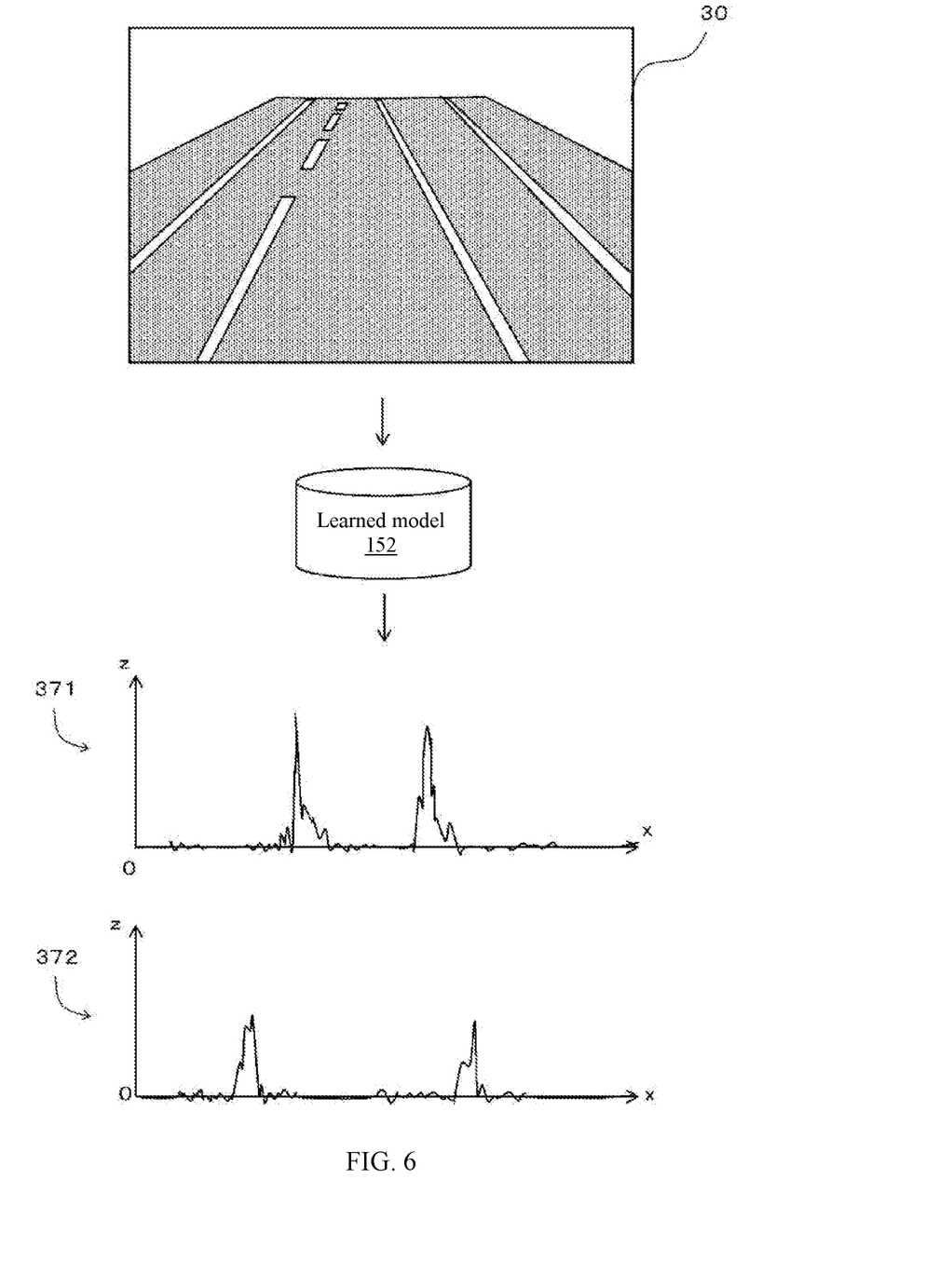
FIG. 6 is a diagram illustrating an example of a captured image 30 and position specifying information 371 and 372 as inputs and outputs of the learned model 152.

Using the learned model 152 generated in this way, the boundary line detection device 10 detects a target marker line included in a captured image. FIG. 5 is a flowchart showing an example of the processing performed by the device 10 in the detection of a target marker line. First, as shown in the drawing, the device 10 inputs a captured image to the learned model 152 and acquires position specifying information outputted from this learned model 152 (step S100). For example, as shown in FIG. 6, when the captured image 30 is inputted to the learned model 152, information including two sets of position specifying information 371 and 372 is outputted. In this example, the captured image 30 is inputted to the learned model 152 as a three-channel (RGB) color image.

Then, the device 10 specifies a plurality of estimated points that are estimated to be points on the target marker line included in the captured image on the basis of the acquired position specifying information (step S105). More specifically, the device 10 specifies an estimated point corresponding to the position in the width direction specified by the first position specifying information as an estimated point at the height y1, and specifies an estimated point corresponding to the position in the width direction specified by the second position specifying information as an estimated point at the height y2.

Figure 7:
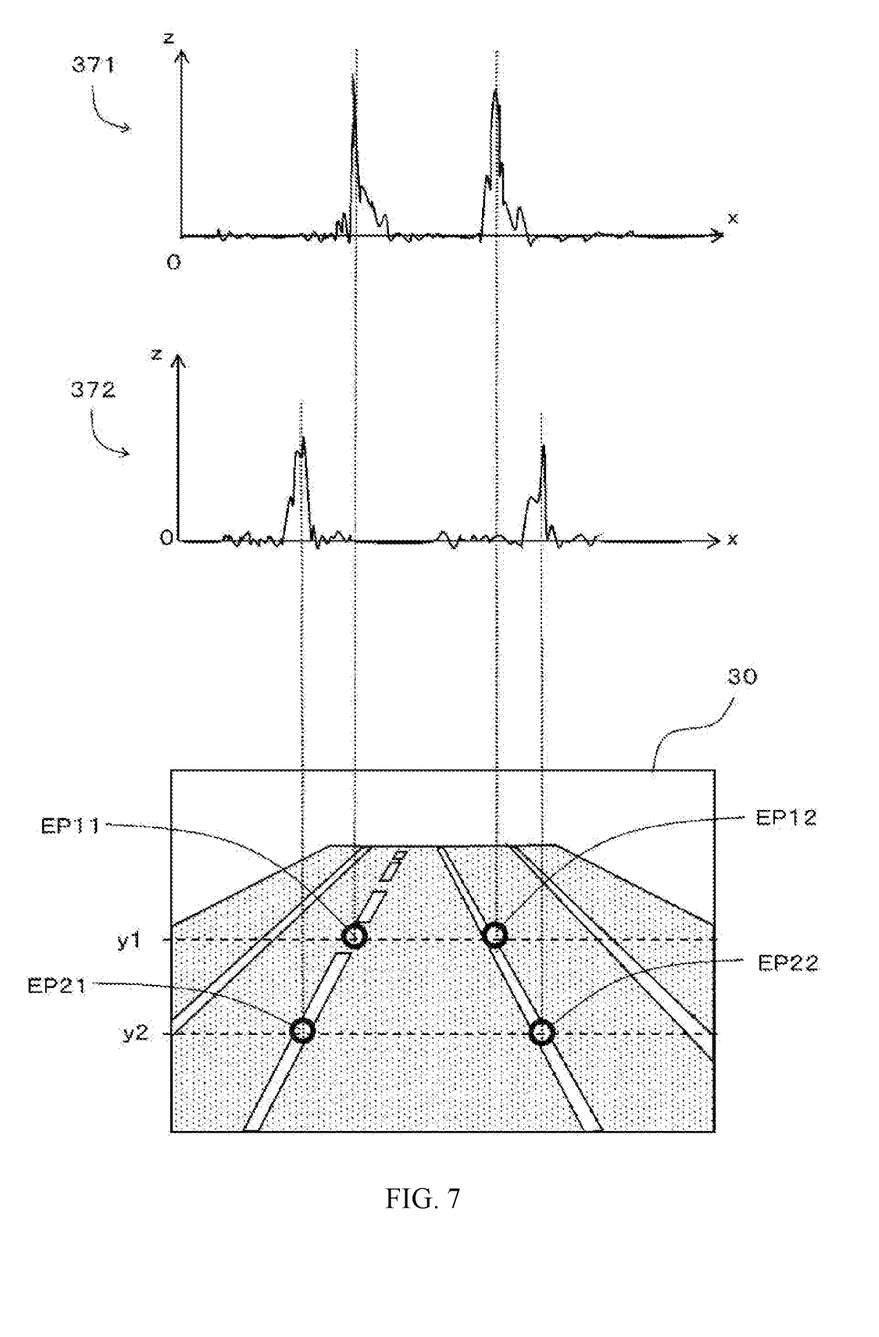
FIG. 7 is a diagram illustrating a plurality of estimated points specified on the basis of the position specifying information 371 and 372.

FIG. 7 is a diagram illustrating a plurality of estimated points specified on the basis of the two sets of position specifying information 371 and 372 shown in FIG. 6. As shown in FIG. 7, at the height y1 of the captured image 30, two estimated points EP11 and EP12 having positions in the width direction corresponding to two peak values in the first position specifying information 371 having a one-dimensional array format are specified, and at the height y2 of the captured image 30, two estimated points EP21 and EP22 having positions in the width direction corresponding to two peak values in the second position specifying information 372 similarly having a one-dimensional array format are specified.

Figure 8:
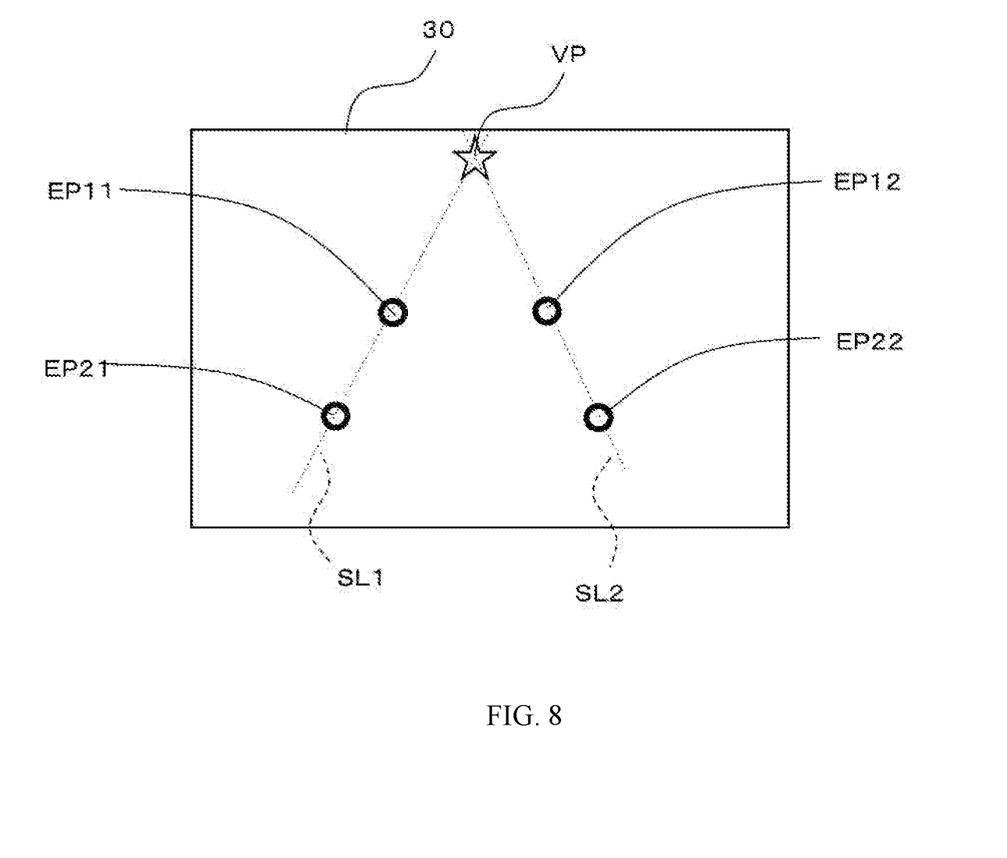
FIG. 8 is a diagram illustrating a method for grouping estimated points on the basis of a straight line passing through a vanishing point.

Once a plurality of estimated points have thus been specified, the device 10 then groups the plurality of estimated points (step S110). In this example, the grouping of the estimated points is performed on the basis of a straight line passing through the vanishing point in the captured image 30. FIG. 8 is a diagram illustrating a method for grouping estimated points on the basis of a straight line passing through a vanishing point. The vanishing point is the point at which a plurality of parallel straight lines converge in perspective, and the vanishing point in the captured image 30 in FIG. 8 is shown as a star-shaped vanishing point VP. In this example, a specific position (coordinates) in the captured image 30 is preset as the position of the vanishing point.

In this example, estimated points whose distance from a specific straight line passing through the vanishing point is within a specific range are classified into the same group. More specifically, the device 10 selects an arbitrary estimated point included in the plurality of specified estimated points, specifies other estimated points whose distance from a straight line connecting the selected estimated point and the vanishing point is within a specific range, and classifies the selected estimation point and other specified estimation points into the same group. For instance, in the example in FIG. 8, since the estimated point EP11 is located on the straight line SL1 passing through the lower-left estimation point EP21 and the vanishing point VP, these estimated points EP21 and EP11 are classified into the same group. Likewise, since the estimated point EP12 is located on the straight line SL2 passing through the lower-right estimated point EP22 and the vanishing point VP, these estimated points EP22 and EP12 are classified into the same group.

The device 10 then detects a boundary line for each group (step S120). More specifically, a straight line connecting two estimated points belonging to the same group is detected as a marker line. In the example in FIG. 8, two marker lines are detected, namely, a marker line corresponding to a straight line connecting the estimated point EP21 and the estimated point EP11 and a marker line corresponding to a straight line connecting the estimated point EP22 and the estimated point EP12.

Thus, the boundary line detection device 10 can detect the target marker line for each captured image. Then, the layout of the target marker line to be detected in the image indicates the relative position of the vehicle with respect to the lane in which it is traveling. For example, the boundary line detection device 10 sequentially detects target marker lines included in a plurality of consecutive images captured while the vehicle is traveling (a plurality of consecutive still pictures constituting a moving picture), which allows changes in the relative position with respect to the lane in which the vehicle is traveling to be determined. As a result, for example, weaving back and forth or departure from the lane can be detected, a warning corresponding to what is detected can be given, and the skill of the driver can be evaluated, among other things. The detection of the relative position of the vehicle with respect to the lane in which it is traveling can also be put to use in the control of an autonomous vehicle, etc.

Figure 9:
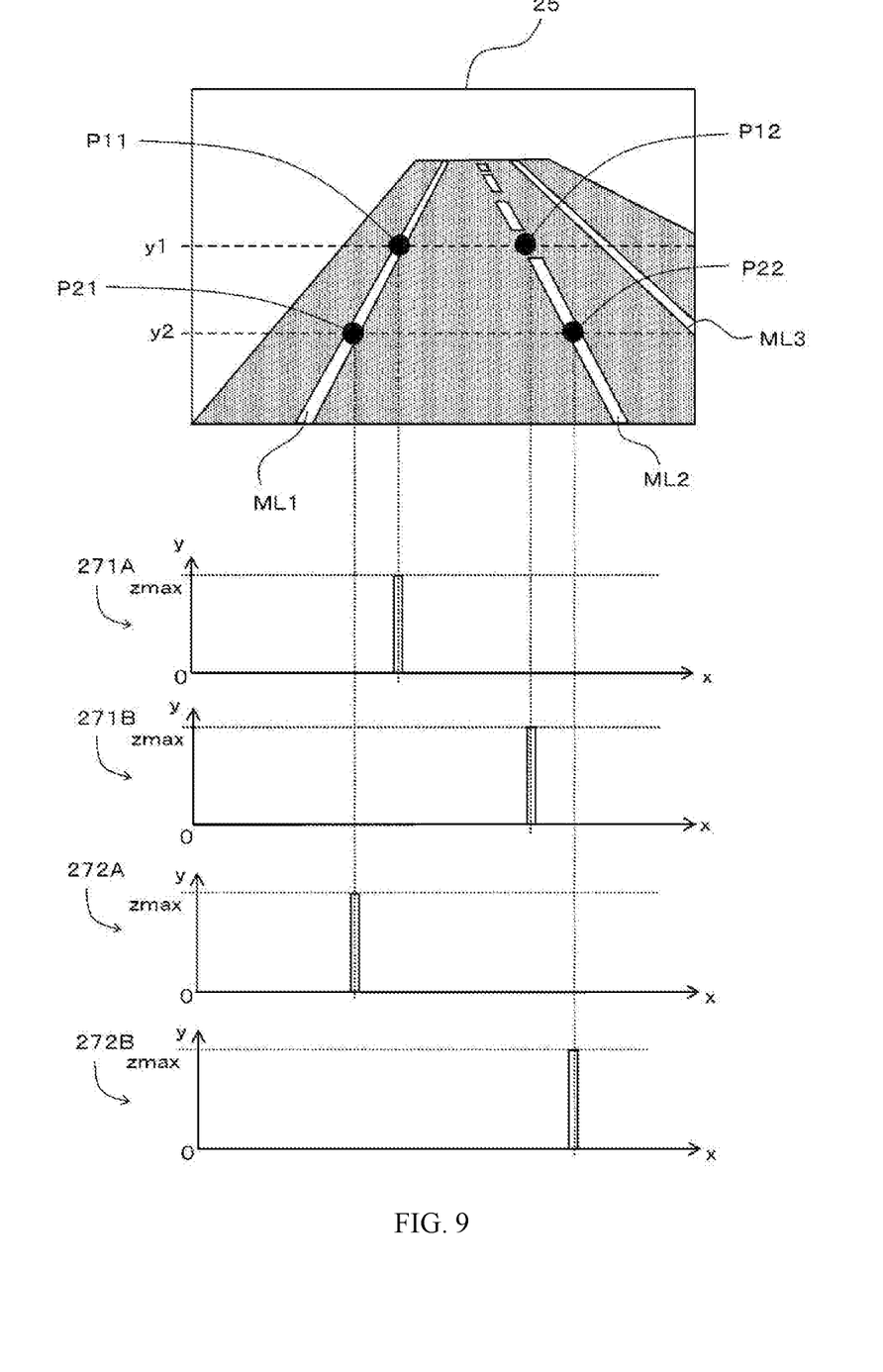
FIG. 9 is a diagram illustrating position specifying information 271A, 271B, 272A, and 272B associated with the learning image 25 in another specific example.

In another specific example of this embodiment, the target marker lines are detected so as to distinguish types of the marker lines. FIG. 9 is a diagram illustrating position specifying information 271A, 271B, 272A, and 272B associated with the learning image 25 in this other specific example. As shown in the drawing, the position specifying information 271A and 272A specify the position in the width direction of a marker line that is a "solid line" at the heights y1 and y2, and the position specifying information 271B and 272B specify the position in the width direction of a marker line that is a "broken line" at the heights y1 and y2. The learned model 152 generated by machine learning that uses the learning images with which this position specifying information is associated as learning data is configured to output four sets of position specifying information when a captured image is inputted. The boundary line detection device 10 in this example specifies estimated points on solid marker lines on the basis of the two sets of position specifying information corresponding to a solid line (out of the four sets of position specifying information outputted from the learned model 152), while also specifying estimated points on broken marker lines on the basis of the two sets of position specifying information corresponding to a broken line, and can detect marker lines of each type on the basis of these estimated points for each type.

In the above example, the marker lines on both sides of the lane in which the vehicle is traveling were the target of detection, but other marker lines may be detected instead. Also, a boundary line other than a marker line (such as a boundary line between the roadway and a sidewalk) can be detected.

In the above example, estimated points were specified at the two heights y1 and y2, but estimated points may instead be specified at three or more heights. In this case, since three or more estimated points will be specified for each marker line, it is also possible to detect curved marker lines, for example.

The boundary line detection device 10 according to this embodiment as described above is configured to detect a boundary line included in a captured image on the basis of a plurality of estimated points specified using the learned model 152, and the detection of the boundary line makes use of a machine learning approach. As a result, a more robust system with less influence from the external environment can be achieved, as compared to when a rule-based approach is employed.

The processing and procedures described in this Specification may be implemented by software, hardware, or any combination thereof, besides what has been explicitly described. For instance, the processing and procedures described in this Specification may be implemented by installing a logic circuit corresponding to the processing and procedures on a medium such as an integrated circuit, a volatile memory, a nonvolatile memory, or a magnetic disk. Also, the processing and procedures described in this Specification can be implemented as a computer program (e.g., non-transitory computer-readable medium including instructions to be performed on a processor) corresponding to the processing and procedures, and can be executed by various kinds of computers.

Even though the processing and procedures described in this Specification are described as being executed by a single device, piece of software, component, or module, the processing or procedures may instead be executed by multiple devices, multiple pieces of software, multiple components, and/or multiple modules. Also, the software and hardware elements described in this Specification can also be realized by combining them into fewer elements, or by breaking them up into more elements.

In this Specification, when the constituent elements of the invention are referred to in either the singular or the plural, or when described without reference to either singular or plural, these constituent elements may be either singular or plural, except when the context should be interpreted otherwise.

DESCRIPTION OF THE REFERENCE NUMERALS

10 Boundary line detection device
11 CPU
112 Image acquisition component
114 Boundary line detector
15 Storage
152 Learned model
20 Learning data
25 Learning image
30 Captured image
271, 272, 371, 372 Position specifying information
ML Marker line (boundary line)
EP Estimated point
VP Vanishing point

The invention claimed is:

1. A device for detecting a boundary line included in a captured image, comprising one or more computer processors,
wherein, in response to the execution of a readable instruction, said one or more computer processors executes:
acquiring a captured image and
detecting a boundary line included in the acquired captured image; and
the detection includes specifying, using a learned model, a plurality of estimated points estimated to be points on a boundary line included in the acquired captured image and detecting the boundary line included in the acquired captured image based on at least the specified plurality of estimated points,
wherein the learned model is generated by machine learning that uses, as learning data, a plurality of learning images each of which is associated with information including first position specifying information that specifies a position in the width direction at a first height of a boundary line included in the image and second position specifying information that specifies a position in the width direction at a second height of a boundary line included in the image, and is configured so that first and second position specifying information corresponding to an inputted image are estimated and outputted, and
the detection includes specifying the plurality of estimated points based n the first and second position specifying information outputted from the learned model.

2. The device according to claim 1,
wherein the learned model comprises a convolutional neural network.

3. The device according to claim 1,
wherein the detection comprises detecting a straight boundary line based on two or more estimated points.

4. The device according to claim 1,
wherein the detection comprises detecting a curved boundary line based on at least three or more estimated points.

5. The device according to claim 1,
wherein the detection comprises classifying the specified plurality of estimated points into one or more groups, and detecting a boundary line corresponding to each of the one or more groups based on at least the estimated points classified for each of the one or more groups.

6. The device according to claim 5,
wherein the detection comprises classifying a plurality of estimated points, whose distances from a specific line passing through a vanishing point in the captured image in the acquired captured image fall within a range, into the same group.

7. The device according to any of claim 1,
wherein the detection includes distinguishably specifying a first type of estimated points estimated to be located on a first type of boundary line and a second type of estimated points estimated to be located on a second type of boundary line, and distinguishably detecting the first type of boundary line and the second type of boundary line based on at least the specified plurality of first and second types of estimated points.

8. The device according to claim 7,
wherein the learned model is generated by machine learning that uses, as learning data, a plurality of learning images each of which is associated with information including third position specifying information that specifies the position of points on a first type of boundary line included in the image and fourth position specifying information that specifies the position of points on a second type of boundary line included in the image, and is configured so that third and fourth position specifying information corresponding to an inputted image are estimated and outputted, and
the detection includes specifying a first type of estimated points based on third position specifying information outputted from the specific learned model, while also specifying a second type of estimated points based on fourth position specifying information outputted from the specific learned model.

9. The device according to any of claim 1,
wherein the captured image is an image showing what is ahead of or behind a traveling vehicle, and
the boundary line includes a boundary line of a lane of a road.

10. A method for detecting a boundary line included in a captured image, executed by one or more computers,
wherein said method comprises:
acquiring a captured image; and
detecting a boundary line included in the acquired captured image; and
the detection includes specifying, using a learned model, a plurality of estimated points estimated to be points on a boundary line included in the acquired captured image and detecting the boundary line included in the acquired captured image based on at least the specified plurality of estimated points,
wherein the learned model is generated by machine learning that uses, as learning data, a plurality of learning images each of which is associated with information including first position specifying information that specifies a position in the width direction at a first height of a boundary line included in the image and second position specifying information that specifies a position in the width direction at a second height of a boundary line included in the image, and is configured so that first and second position specifying information corresponding to an inputted image are estimated and outputted, and
the detection includes specifying the plurality of estimated points based on the first and second position specifying information outputted from the learned model.

11. A non-transitory computer-readable medium including instructions for detecting a boundary line included in a captured image, the instructions to be performed on a processor, the instructions, comprising:
processing to acquire a captured image and
processing to detect a boundary line included in the acquired captured image; and
the detection processing includes specifying, using a learned model, a plurality of estimated points estimated to be points on a boundary line included in the acquired captured image and detecting the boundary line included in the acquired captured image based on at least the specified plurality of estimated points,
wherein the detection includes distinguishably specifying a first type of estimated points estimated to be located on a first type of boundary line and a second type of estimated points estimated to be located on a second type of boundary line, and distinguishably detecting the first type of boundary line and the second type of boundary line based on at least the specified plurality of first and second types of estimated points, and
wherein the learned model is generated by machine learning that uses, as learning data, a plurality of learning images each of which is associated with information including third position specifying information that specifies the position of points on a first type of boundary line included in the image and fourth position specifying information that specifies the position of points on a second type of boundary line included in the image, and is configured so that third and fourth position specifying information corresponding to an inputted image are estimated and outputted, and
the detection includes specifying a first of estimated points based on third position specifying information outputted from the specific learned model, while also specifying a second type of estimated points based on fourth position specifying information outputted from the specific learned model.

* * * * *